United States Patent [19]

Ben-Natan et al.

[11] Patent Number: 5,740,354

[45] Date of Patent: Apr. 14, 1998

[54] METHOD AND SYSTEM FOR ASSOCIATING RELATED ERRORS IN A COMPUTER SYSTEM

[75] Inventors: Or Ben-Natan; Michael L. Davis, both of Bellevue; Bruce W. Copeland, Redmond, all of Wash.

[73] Assignee: Microsoft Corporation, Redmond, Wash.

[21] Appl. No.: 562,823

[22] Filed: Nov. 27, 1995

[51] Int. Cl.$^6$ .......................................................... G06F 11/00

[52] U.S. Cl. .................. 395/183.21; 395/185.1; 364/265; 364/267; 364/943.9

[58] Field of Search ................. 395/183.21, 185.01, 395/183.14, 183.01, 183.22, 185.1; 364/265, 948.11, 943.9, 267, 275.5

[56] References Cited

U.S. PATENT DOCUMENTS

| | | | |
|---|---|---|---|
| 4,755,997 | 7/1988 | Takahashi | 371/19 |
| 5,047,977 | 9/1991 | Hill et al. | 364/900 |
| 5,090,014 | 2/1992 | Polich et al. | 371/15.1 |
| 5,119,377 | 6/1992 | Cobb et al. | 371/19 |
| 5,157,667 | 10/1992 | Carusone, Jr. et al. | 371/29.1 |
| 5,311,422 | 5/1994 | Loftin et al. | 364/401 |
| 5,463,768 | 10/1995 | Cuddihy et al. | 395/183.13 |
| 5,539,877 | 7/1996 | Winokur et al. | 395/183.02 |

*Primary Examiner*—Robert W. Beausoliel, Jr.
*Assistant Examiner*—Dieu-Minh Le
*Attorney, Agent, or Firm*—Seed and Berry LLP

[57] ABSTRACT

A method and system for associating related errors in a computer system is provided. In a preferred embodiment, an error reported by a first program is associated with a related error reported by a second program that calls the first program. The first program detects the occurrence of an error, and, in response, generates a first error report containing information describing the error detected by the first program. The first error report is thereafter associated with a first error report identifier identifying the first error report. When the first program later returns to the second program, the second program also detects the occurrence of an error. In response, the second program likewise generates an error report containing information describing the error detected by the second program. The second error report is thereafter associated with a second error report identifier identifying the second error report. After the first and second error reports have been generated, the method and system generates an indication that the error reports identified by the first and second error report identifiers are related.

18 Claims, 12 Drawing Sheets

ERROR LOG 900

| REFERENCE | ERROR REPORT |
|---|---|
| ... | ... |
| 7057 | Could not open file expenses.xls -- corrupted. |
| 7095 | Could not open spreadsheet document expenses. |
| 7214 | Could not print document. |
| 7032 | Electronic mail gateway not available. |
| 7122 | Could not send electronic mail message to Thaddeus. |
| 7055 | Could not access server \\server7. |
| 7125 | Could not open file \\server7\config\shell.cfg. |
| 7126 | Could not open configuration object. |
| 7227 | Could not display configuration information. |
| ... | ... |

| REFERENCE | ERROR LOG |
|---|---|
| | ERROR REPORT |
| ... | ... |
| 7032 | Electronic mail gateway not available. |
| 7055 | Could not access server \\server7. |
| 7057 | Could not open file expenses.xls -- corrupted. |
| 7095 | Could not open spreadsheet document expenses. |
| 7122 | Could not send electronic mail message to Thaddeus. |
| 7125 | Could not open file \\server7\config\shell.cfg. |
| 7126 | Could not open configuration object. |
| 7214 | Could not print document. |
| 7227 | Could not display configuration information. |
| ... | ... |

ERROR LOG 1100

| REFERENCE | ERROR REPORT |
|---|---|
| ... | ... |
| 7032 | Electronic mail gateway not available. |
| 7055 | Could not access server \\server7. |
| 7057 | Could not open file expenses.xls -- corrupted. |
| 7095 | Could not open spreadsheet document expenses. |
| 7122 | Could not send electronic mail message to Thaddeus. |
| 7125 | Could not open file \\server7\config\shell.cfg. |
| 7126 | Could not open configuration object. |
| 7214 | Could not print document. |
| 7227 | |
| 7057 | Could not open file expenses.xls -- corrupted. |
| 7095 | Could not open spreadsheet document expenses. |
| 7214 | Could not print document. |
| ... | ... |

1205 { The following related errors were recently encountered:

1210 { • Could not print document.

1220 { • Could not open spreadsheet document expenses.

1230 { • Could not open file expenses.xls -- corrupted.

FIG. 12

METHOD AND SYSTEM FOR ASSOCIATING RELATED ERRORS IN A COMPUTER SYSTEM

TECHNICAL FIELD

The invention relates generally to a method and system in a computer system for error handling, and, more specifically, to a method and system for associating related errors.

BACKGROUND OF THE INVENTION

Until recently, the architectural paradigm for computer programming was procedural programming. According to the procedural programming paradigm, single, large programs contain all of the code and have access to all of the data required to perform a particular high level task, and to generate an error message that is meaningful to a user if the task fails. For instance, in order to print a spreadsheet document, a spreadsheet program implemented according to the procedural programming paradigm has access to all of the data required to call an operating system function that opens a file corresponding to the spreadsheet document. Code Block 1 shows pseudocode for a portion of such a procedural spreadsheet application program that inputs the name of a spreadsheet document to print (line 1), constructs a file name from the spreadsheet document name (line 2), and calls an operating system operation called "_open" to open the file having the constructed filename (line 3).

| Code Block 1 |
|---|
| 1  input ("Name of spreadsheet document to print: ", spreadsheet__name); |
| 2  file__name = spreadsheet__name + ".xls"; |
| 3  result = _open (file__name, file__handle); |

If a task performed by a procedural program tills, the procedural program typically has access to all of the data required to generate an error message that is meaningful to a user. Code Block 2 shows an example of the procedural program detecting different forms of failure of the operating system _open operation (lines 1 and 5), and, in response, producing an error message that would be meaningful to a user (lines 2–4 and 6–8, respectively).

| Code Block 2 |
|---|
| 1  if (result == FILE__CORRUPT) { |
| 2      print ("Error: spreadsheet document " + spreadsheet__name + |
| 3      " could not be printed, because file " + file__name + |
| 4      " has become corrupted."); } |
| 5  else if (result == NO__SUCH__FILE) { |
| 6      print ("Error: spreadsheet document " + spreadsheet__name + |
| 7      " could not be printed, because file " + file__name + |
| 8      "does not exist. "); } |

As a further example, for a spreadsheet document named "expenses," Code Block 2 at lines 2–4 would generate the following error message: "Error: spreadsheet document expenses could not be printed, because file expenses.xls has become corrupted." The error messages generated by Code Block 2 would generally be considered meaningess to the user, because they incorporate information about the error at the level at which the user is familiar with the system, namely documents within applications and files within the file system. The incorporated information will therefore likely be useful in understanding and remediating the error. The procedural error reporting program may immediately display the error message, as shown in Code Block 2, and/or store it in an error log for later review by the user or a system administrator.

An architectural paradigm for computer programming called "object oriented programming", which is significantly different from procedural programming, has recently become popular. According to the object oriented programming paradigm, programs are implemented using objects that contain data for maintaining state and programs called "methods" for providing services relating to that state. One of the primary design principles for such objects is that they should endeavor to "encapsulate" their data so that it is not directly available to programs besides their own methods. The encapsulation principle causes programs outside an object to access the object's data via the object's methods, which has two related primary benefits: (1) access to the object's data by programs outside the object is streamlined in a way that does not require programs outside the object to understand the way in which the object stores its data, and (2) the object's structure and methods may be revised to store the object's data differently without adversely impacting the ability of programs outside the object to access the object's data via the object's methods.

The data encapsulation principle of the object oriented programming paradigm, while providing significant benefits, impedes the ability of programs comprised of objects to generate error messages that are meaningful to users, because information that would make an error message meaningful is often encapsulated in objects, and therefore not available to the program generating the error report for inclusion in an error report. For instance, if the above example about opening a spreadsheet document was implemented using the object oriented programming paradigm, such that the document name was contained in a first object, the filename constructed therefrom contained in a second object, and the nature of the failure of the operating system _open command contained in a third object, none of the objects would have all of the information for inclusion in an error message reporting the failure of the file open operation. This problem also arises in procedural programs that, while not strictly object-oriented, are strongly compartmentalized into a number of separate subroutines that each effectively encapsulate data.

SUMMARY OF THE INVENTION

The present invention provides a method and system for associating related errors in a computer system. In a preferred embodiment, an error reported by a first program is associated with a related error reported by a second program that calls the first program. The first program detects the occurrence of an error, and, in response, generates a first error report containing information describing the error detected by the first program. The first error report is thereafter associated with a first error report identifier identifying the first error report. When the first program later returns to the second program, the second program also detects the occurrence of an error. In response, the second program likewise generates an error report containing information describing the error detected by the second program. The second error report is thereafter associated with a second error report identifier identifying the second error report. After the first and second error reports have been generated, the method and system generates an indication that the error reports identified by the first and second error report identifiers are related.

BRIEF DESCRIPTION OF THE DRAWINGS

FIG. 9 is a screen diagram showing an error log display format for associating the error reports displayed in the error log that relate to the same error by spatially grouping such error reports together.

FIGS. 10–11 are screen diagrams showing an error log display format for associating the error reports displayed in the error log that relate to the same error by displaying all such errors when one such error is selected by the user.

FIG. 12 is a screen diagram showing a displayed composite error report.

DETAILED DESCRIPTION OF THE INVENTION

Figure 1:
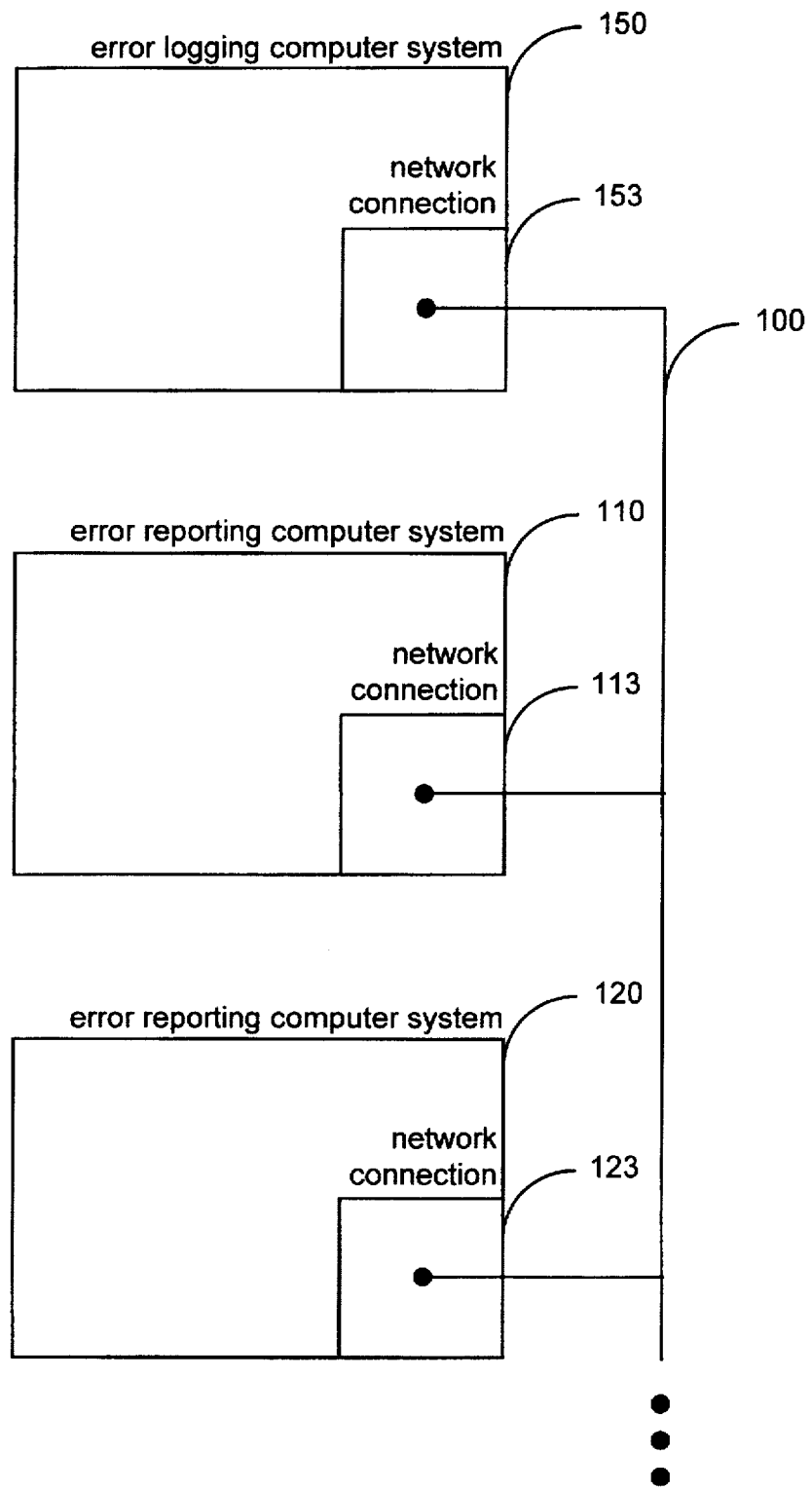
FIG. 1 is a diagram showing the computer network in which the preferred embodiment of the invention is preferably implemented.

According to a preferred embodiment, an error linking data structure is shared by a series of programs; such as methods of different objects, that call one another, and that are specially adapted to utilize the error linking data structure. When a program in the series encounters an error, that program generates an error report and stores an indication identifying the generated error report in the error linking data structure. The program that encountered the error then returns to the program in the series that called it, which also generates an error report and stores an indication identifying the error report in the error linking data structure. This process preferably continues until control returns to the first program in the series, which also generates an error report and stores an indication identifying the error report in the error linking data structure. The error linking data structure is then used to associate together ("associate") the error reports generated by the programs in the series, to permit a user to consider together the information about the error contained in the separate error reports.

As an example, in response to an attempt by a user to print a spreadsheet document called "expenses," each of a series of three programs may fail when the file containing the spreadsheet document becomes corrupted. In the example, the third program in the series generates an error report to the effect that the file "expenses.xls" could not be opened for reading because it has become corrupted, the second program generates an error report to the effect that the spreadsheet document "expenses" could not be opened, and the first program generates an error report to the effect that the printing of a document failed. Such error reports, distributed throughout an extensive stream of other error reports, may not help users to understand the error. This is particularly true when the error reports are being reviewed by a user other than the one that attempted to print the spreadsheet document, such as a system administrator. However, by using the information in the error linking data structure to associate the three error reports as relating to the same logical error, any user is able to determine that the spreadsheet document "expenses" could not be printed because the associated file "expenses.xls" has become corrupted. This example is discussed in greater detail below. In a preferred embodiment, error reports associated by the error linking data structure are said to be associated with each other. Such error reports may alternatively be said to be associated with the same error, i.e., the same cause.

The error linking data structure may be utilized in a variety of ways to associate the error reports identified by the indications that it contains. In a preferred embodiment, each of the error reports generated by programs in the series are forwarded to and maintained in a central error log, along with error reports generated by other programs. The information stored in the error linking data structure is also forwarded to the central error log, allowing the central error log to indicate the association between the error reports generated by programs in the series. The error log is preferably managed by an error log management program, which presents to users the error reports forwarded to the error log. The error log management program preferably uses the information stored in the error linking data structure to associate error reports presented in the error log that are related to the same error. In a preferred embodiment, the error log management program displays error reports related to the same error together in a group. In an alternate embodiment, when a user selects one of the error reports relating to an error, the error log management program displays the other error reports relating to that error. In order to forward the information stored in the error linking data structure, the first program in the series preferably forwards to the central error log all of the indications stored in the error linking data structure by programs in the series. Alternatively, when generating its error report, each program in the series incorporates the indications already stored in the error linking data structure by programs of the series that have already returned. As another alternative, each program in the series may instead incorporate in its error report the most recent indication stored in the error linking data structure, which indicates the error report generated by the following program in the series.

In an alternative embodiment, the first program in the series may generate a composite error report containing information from the error reports indicated by the indications stored in the error linking data structure, as well as information about the error known to the first program in the series. The first program in the series may either itself display this composite error report, or forward it to the central error log. In the embodiment in which the first program in the series generates a composite error report, it is not necessary for the first program in the series to store any indication in the error linking structure.

FIG. 1 is a diagram showing the computer network in which the preferred embodiment of the invention is preferably implemented. In an alternate preferred embodiment of the invention the diagram shows the network 100, which facilitates the exchange of information between several computers. The diagram shows two error reporting computer systems 110 and 120, which are connected to the network via network connections 113 and 123, respectively. As is discussed in more detail below, one or more series of programs preferably execute on each of the error reporting computer systems. Each series of programs generates error reports that are associated by information stored in an error linking data structure in accordance with the invention. Although only two error reporting computer systems are shown, it will be appreciated by those skilled in the art that a much larger number of error reporting computer systems can be connected to the network 100. The diagram also shows an error logging computer system 150, which is connected to the network via network connection 153. As is discussed in more detail below, error reports and information from error linking data structures are preferably forwarded from the error reporting computer systems to the error logging computer system, which presents the error reports in a log in such a way that error reports relating to the same errors are presented together. The error logging computer system is also preferably able to link such related errors in other ways. In alternate embodiments of the invention, error linking, reporting, and logging may all be performed in a single computer system, thereby obviating the need for a network such as the one shown in FIG. 1.

Figure 2:
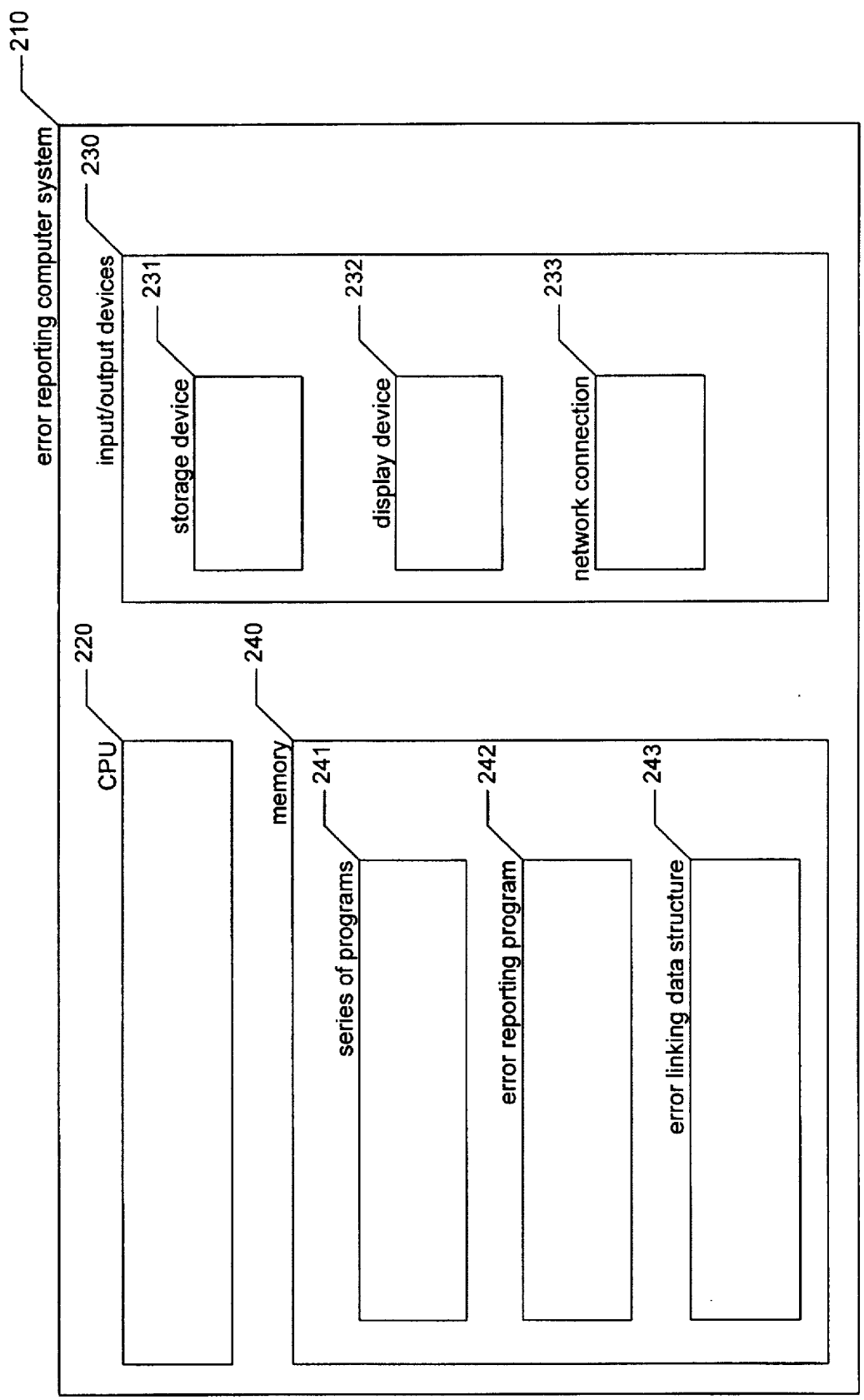
FIG. 2 is a high-level block diagram of the general-purpose computer system upon which a series of programs generating separate error reports preferably executes, such as error reporting computer systems 110 and 120 (FIG. 1).

FIG. 2 is a high-level block diagram of the general-purpose computer system upon which a series of programs generating separate error reports preferably executes, such as error reporting computer systems 110 and 120 (FIG. 1). The error reporting computer system 210 contains a central processing unit (CPU) 220, input/output devices 230, and a computer memory (memory) 240. Among the input/output devices is a storage device 231, such as a hard disk drive; a display device 232, such as a video monitor; and a network connection 233 for communicating with other computer systems. The memory 240 contains one or more series of programs 241 as described above; a program for reporting errors 242, which is called by programs in the series 242 to generate error reports and forward error linking information to the error log; and one or more error linking data structures 243. All of the programs stored in the memory 240 preferably execute on the CPU. While preferred embodiments of the invention are preferably implemented on computer systems configured as described above, one skilled in the art will recognize that it may also be implemented on computer systems having different configurations.

Figure 3:
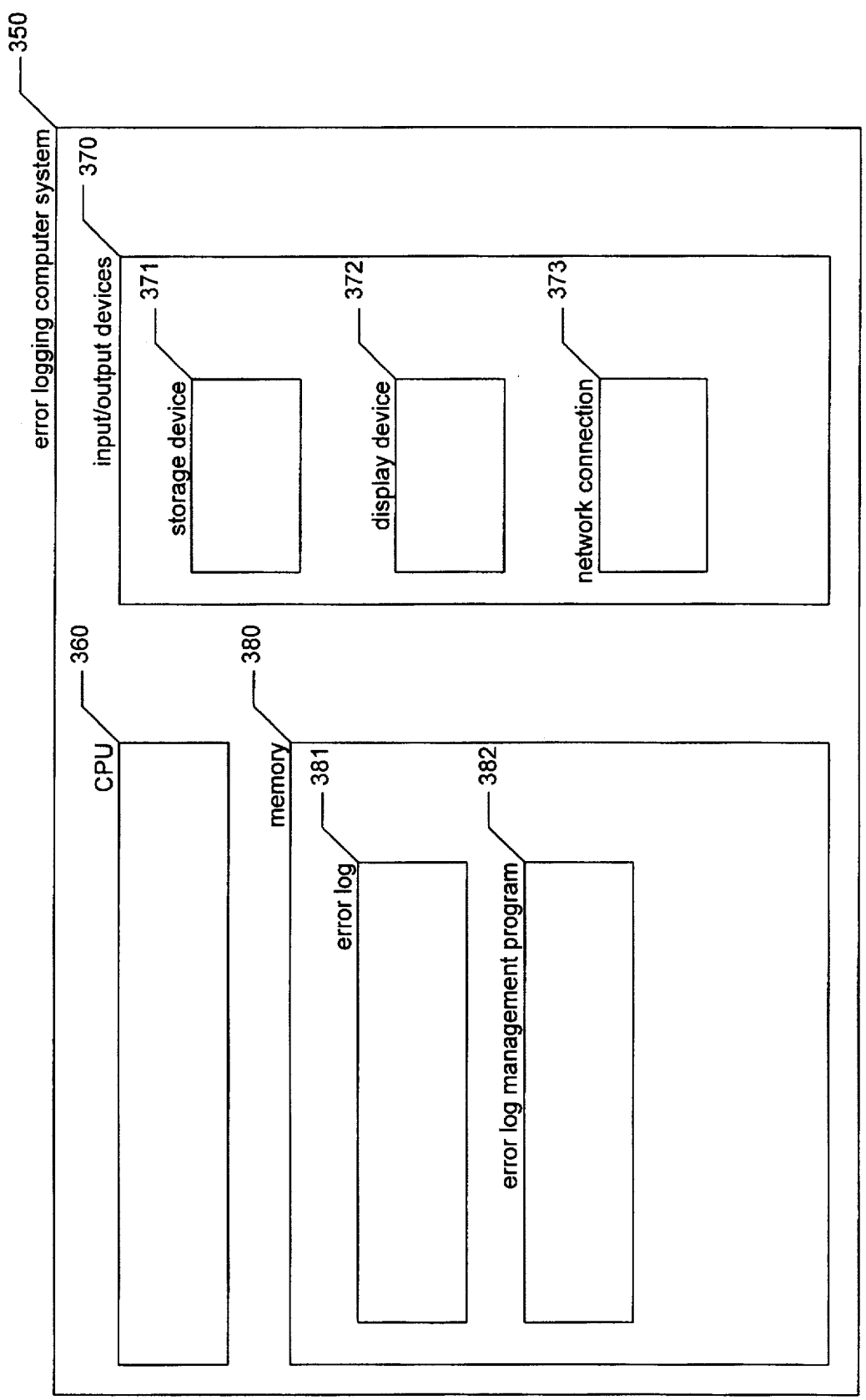
FIG. 3 is a high-level block diagram of the error log in computer system 350.

FIG. 3 is high-level block diagram of the error logging in computer system 150 (FIG. 1). The error logging computer system 350 contains a central processing unit (CPU) 360, input/output devices 370, and a computer memory (memory) 380. Like the input/output devices 220 of the error reporting computer system 210 (FIG. 2), the input/output devices 370 of the error logging computer system include a storage device 371, such as a hard disk drive; a display device 372, such as a video monitor; and a network connection 373 for communicating with other computer systems. The memory 380 preferably contains an error log 381 for storing error reports and error linking information and an error log management program 382 for receiving, maintaining and presenting error reports in accordance with the invention. One skilled in the art will recognize that the error log 381 may be stored in a number of other devices besides the memory 380, such as the storage device 371. The programs comprising a preferred embodiment of the invention and stored in computer memories 230 (FIG. 2) and 380 are preferably originally provided to customers on one or more instances of computer-readable media, such as optical or magnetic disks.

Preferred embodiments of the invention will be discussed in detail with reference to a sample series of programs. The sample series is one example of an object-oriented version of the procedural code fragments shown in Code Blocks 1 and 2 and discussed above. Pseudocode for the sample series is shown in Code Block 3 below. For brevity, portions of the pseudocode not essential to the discussion are omitted, generally replaced by ellipses. For the same reason, all variable type declarations are also omitted.

| Code Block 3 |
|---|

```
1   class document_manager {
2       public: print_document (); }
3
4   document_manager::print_document () {
5       input ("Type of document to print: ", doc_type);
6       if (doc_type == "spreadsheet") {
7           pss = new (spreadsheet);
8           if (pss->open == ERROR) {
9               GenErrRept ("Could not print document.");
10              return (ERROR); }
11          ... }
12      ... }
13
14
15  class spreadsheet {
16      private: doc_name;
17          file_name;
18      public: open ();
19          ... }
20
21  spreadsheet::open () {
22      input ("Name of spreadsheet document: ", doc_name);
23      file_name = doc_name + ".xls";
24      pfile = new (file (file_name));
25      if (pfile->open == ERROR) {
26          GenErrRept ("Could not open spreadsheet document " + doc_name + ".");
27          return (ERROR); }
28      ... }
29
30
31  class file {
```

| Code Block 3 |
| --- |
| 32      private: result; |
| 33             file_handle; |
| 34      public: file_name; |
| 35             file (file_name); |
| 36             open(); |
| 37             ... } |
| 38 |
| 39      file::open () { |
| 40             result = _open (file_name, file_handle); |
| 41             if (result == CORRUPTED) { |
| 42                    GenErrRept ("Could not open file " + file_name + "—corrupted."); |
| 43                    return (ERROR); } |
| 44             else if (result == NO_SUCH_FILE) { |
| 45                    GenErrRept ("Could not open file " + file_name + "—does not exist."); |
| 46                    return (ERROR); } |
| 47             ... } |

The sample series is comprised of three methods of three different objects. The first program in the series is a "print_document" method (lines 4-12) of a "document_manager" object (lines 1-2). The print_document method inputs a document type to open (line 5), instantiates a new instance of a "spreadsheet" object (line 7), and invokes an "open" method of the spreadsheet object (line 8). The open method (lines 21-28) of the spreadsheet object (lines 15-19) inputs a document name (line 22), constructs a file name from the document name (line 23), instantiates a new instance of a "file" object, passing the file name to the constructor for the new file object (line 24), and invokes an open method of the file object (line 25). The open method (lines 39-47) of the file object (lines 31-37) calls the _open operating system operation to open a file having the file name passed in by the open method of the spreadsheet object (line 40).

At line 40, the open method of the file object stores the return code returned by the _open operation. In lines 41-43, if the return code returned by the _open operation indicates that the _open operation failed because the file having the file name is corrupted, then the open method of the file object calls a GenErrRept function to generate an error report indicating this failure to open the file and returns an error return code to the open method of the spreadsheet object. The GenErrRept function preferably forwards the generated error report to the error log 381, which is central to a group of connected error reporting computer systems, or, alternatively, to an error log that is local to the error reporting computer system (not shown). In lines 44-46, the open method of the file object determines whether the _open operation failed because the file does not exist, and, if so, calls the GenErrRept function to generate an error report to that effect and returns an error return code to the open method of the spreadsheet object. In lines 25-27, if the error return code is returned by the open method of the file object, then the open method of the spreadsheet object calls the GenErrRept function to generate an error report indicating that the spreadsheet document cannot be opened, and returns the error return code to the print_document method of the document_manager object. In lines 8-10, if the open method of the spreadsheet object returns the error return code, the print_document method of the document_manager object calls the GenErrRept function to generate an error report to the effect that a document could not be printed and returns the error return code to the program that called the print_document method of the document_manager object.

It can be seen from the above discussion of Code Block 3 that this sample series of programs behaves as described in the overview of the example above, generating three distinct error reports containing different information about the error.

Figure 4:
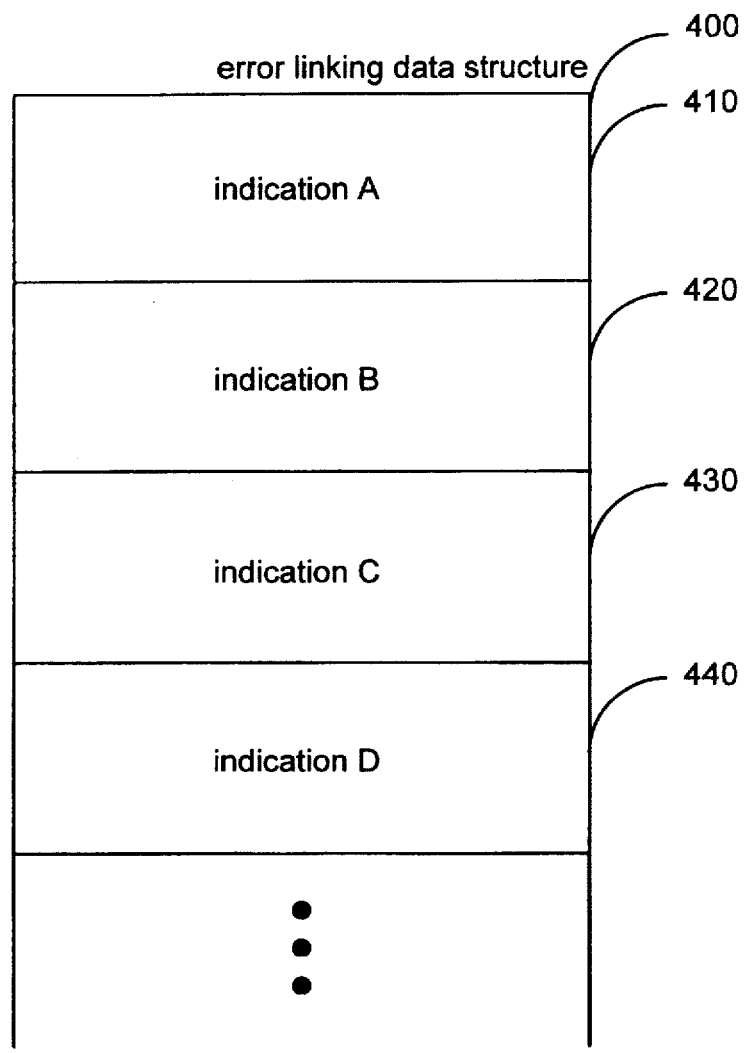
FIG. 4 is a diagram showing the contents of an error linking data structure.

As discussed above, the present invention provides an error linking data structure for containing information that associates related errors. FIG. 4 is a diagram showing the contents of an error linking data structure. The error linking data structure 400 contains a sequence of indications of error reports that relate to the same error, such as indications 410, 420, 430, and 440. Each indication is added to the error linking data structure by the program in the series that generated the indicated error report. Error linking data structures are preferably implemented as objects of a class that provides one or more data members in which indications may be stored (preferably represented as a stack), as well as methods for storing indications in and retrieving indications from the data members. In an alternative embodiment, the programs in a series themselves store indications in and retrieve indications from the error linking data structure.

According to the preferred embodiment of the invention discussed above, the sample series of programs shown in Code Block 3 is modified as shown below in Code Block 4 in order to collect and forward error linking information. Added text is shown in italics, while added lines are indicated by line numbers ending in a letter. The modified sample series of programs is discussed in conjunction with FIGS. 5-7 below.

| Code Block 4 |
| --- |
| 1      class document_manager { |
| 2             public: print_document (); } |
| 3 |
| 4      document_manager::print_document () { |
| 4A            *error_link = new (error_link);* |

-continued

| Code Block 4 | |
|---|---|
| 4B | initialize (error_link); |
| 5 | input ("Type of document to print: ", doc_type); |
| 6 | if (doc_type == "spreadsheet") { |
| 7 | pss = new (spreadsheet); |
| 8 | if (pss->open (error_link) == ERROR) { |
| 9 | error_ref = GenErrRept ("Could not print document."); |
| 9A | error_link —> add_error_ref (error_ref); |
| 9B | GenErrLinkRept (error_link); |
| 10 | return (ERROR); } |
| 11 | ... } |
| 12 | ... } |
| 13 | |
| 14 | |
| 15 | class spreadsheet { |
| 16 | private: doc_name; |
| 17 | file_name; |
| 18 | public: open (error_link); |
| 19 | ... } |
| 20 | |
| 21 | spreadsheet::open (error_link) { |
| 22 | input ("Name of spreadsheet document: ", doc_name); |
| 23 | file_name = doc_name + ".xls"; |
| 24 | pfile = new (file (file_name)); |
| 25 | if (pfile->open (error_link) == ERROR) { |
| 26 | error_ref = GenErrRept ("Could not open spreadsheet document " + |
| 26A | doc_name + "."); |
| 26B | error_link -> add_error_ref (error_ref); |
| 27 | return (ERROR); } |
| 28 | ... } |
| 29 | |
| 30 | |
| 31 | class file { |
| 32 | private: result; |
| 33 | file_handle; |
| 34 | public: file_name; |
| 35 | file (file_name); |
| 36 | open (error_link); |
| 37 | ... } |
| 38 | |
| 39 | file::open (error_link) { |
| 40 | result = _open (file_name, file_handle); |
| 41 | if (result == CORRUPTED) { |
| 42 | error_ref = GenErrRept ("Could not open file " + |
| 42A | file_name + "— corrupted."); |
| 42B | error_link -> add_error_ref (error_ref); |
| 43 | return (ERROR); } |
| 44 | else if (result == NO_SUCH_FILE) { |
| 45 | error_ref = GenErrRept ("Could not open file " + |
| 45A | file_name + " — does not exist."); |
| 45B | error_link -> add_error_ref (error_ref); |
| 46 | return (ERROR); } |
| 47 | ... } |

For purposes of the invention, the programs in a series are divided into three categories: the first program in the series to be called; any "middle" programs in the series that are called after the first program and before the last program in the series that is called; and the last program in the series that is called. These categories of programs are discussed in detail below in conjunction with FIGS. 5, 6, and 7, respectively.

Figure 5:
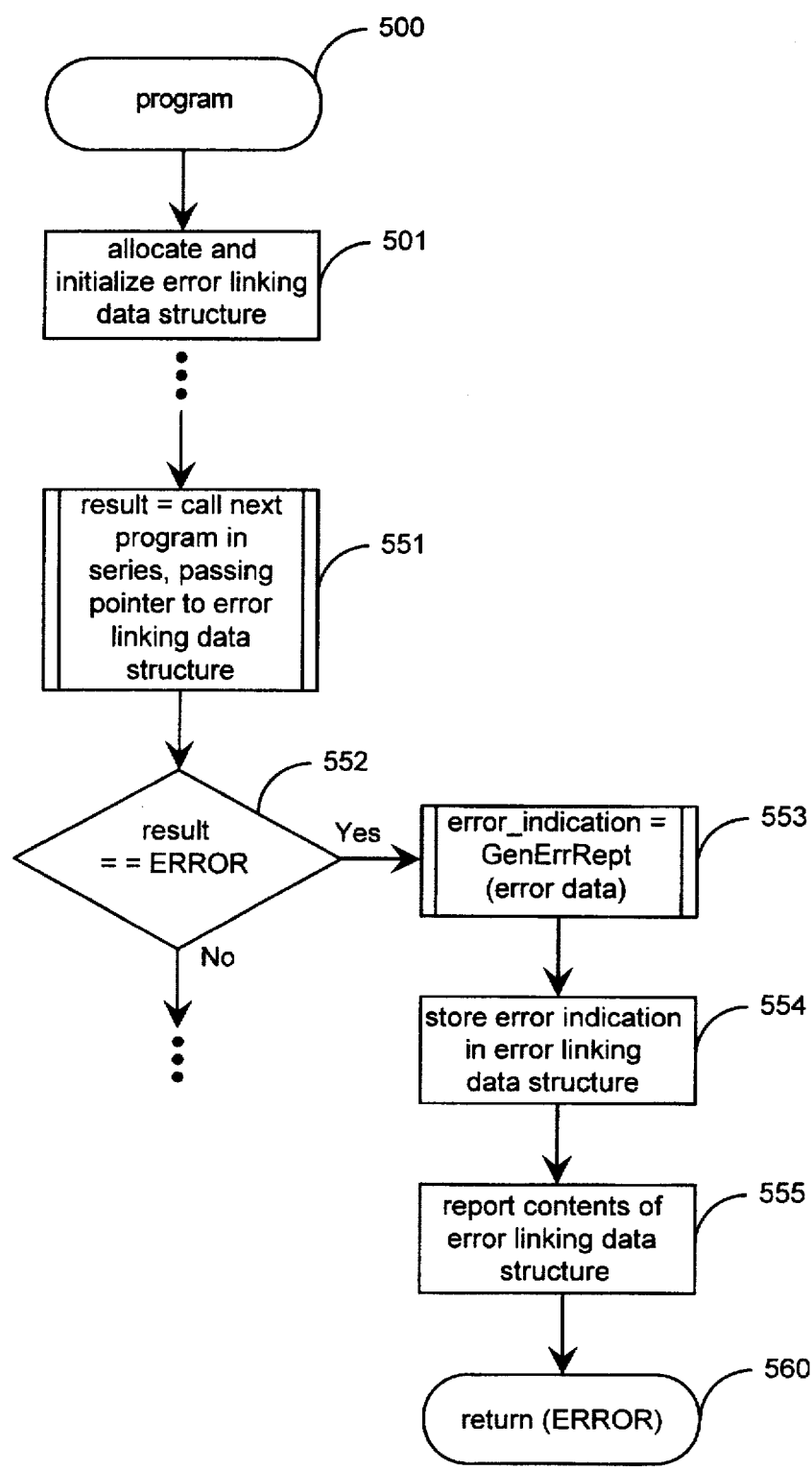
FIG. 5 is a flow diagram of the steps preferably performed by the first program in a series.

FIG. 5 is a flow diagram of the steps preferably performed by the first program in a series. The print_document method of the document_manager object (lines 4–12) is the first program in the sample series of programs shown in Code Block 4. In step 501, the first program allocates an error linking data structure as described above in conjunction with FIG. 4, and initializes the error linking data structure so that it does not contain any error linking information. As discussed above in conjunction with FIG. 4, the error linking data structure is preferably an object of an error linking class, which is instantiated by the first program in step 501. In the sample series, the error linking data structure, called the "error_link" object, is allocated on line 4A and initialized on line 4B. Later, in step 551, the first program calls the second program in the series in order to obtain the functionality of the second program. In the sample series, the first program calls the open method of the spreadsheet object in order to open a spreadsheet object selected by a user for printing (line 8). The first program passes the error linking data structure as a parameter to the second program, so that, if the second program generates an error report, it can store an indication of the error report in the error linking data structure. While this and subsequently-discussed further passing of the error linking data structure is preferably done by reference, one skilled in the art will recognize that the error linking data structure may also be passed by value. The first program stores the return code returned by the second program in a result variable. In step 552, if the return code stored in the result variable is an error return code, then the first program continues at step 553 to handle the error, else the first program continues its normal execution (not shown).

In step 553, the first program calls the GenErrRept function, preferably provided by the error log management program 382 (FIG. 3), in order to generate an error report indicating the operation that the first program was trying to perform by calling the second program. The first program passes the error report contents to the GenErrRept function as a parameter. In the sample series, the print_document method of the document_manager object passes error report contents indicating that a document could not be printed (line 9). The GenErrRept function generates an error report in the error log 381 (FIG. 3), and returns a reference number that identifies the generated error report in the error log 381. In step 554, the first program stores this reference number in the error linking data structure, which the first program can access because it created the error linking data structure. Step 554 preferably involves invoking a method of the error linking data object (error_link) called add_error_ref for storing an error report error reference in the error linking data object (line 9A).

In step 555, the first program reports the indications stored in the error linking data structure to the error log management program 382 (FIG. 3) so that it can use the indications to associate the error reports that they indicate. Step 555 preferably involves calling a GenErrLinkRept function provided by the error log management program 382, passing the complete error linking data structure as a parameter (line 9B). As an optimization, steps 553–555 may alternatively be performed together by merely calling the GenErrRept function, and including the indications stored in the error linking structure by the other programs in the series as part of the error report contents passed as a parameter to the GenErrRept function (not shown). When this optimization is utilized, the error log management program 382 need not provide a separate GenErrLinkRept function.

In step 560, the first program returns an error return code to the program by which it was called (line 10). These steps then conclude.

Figure 6:
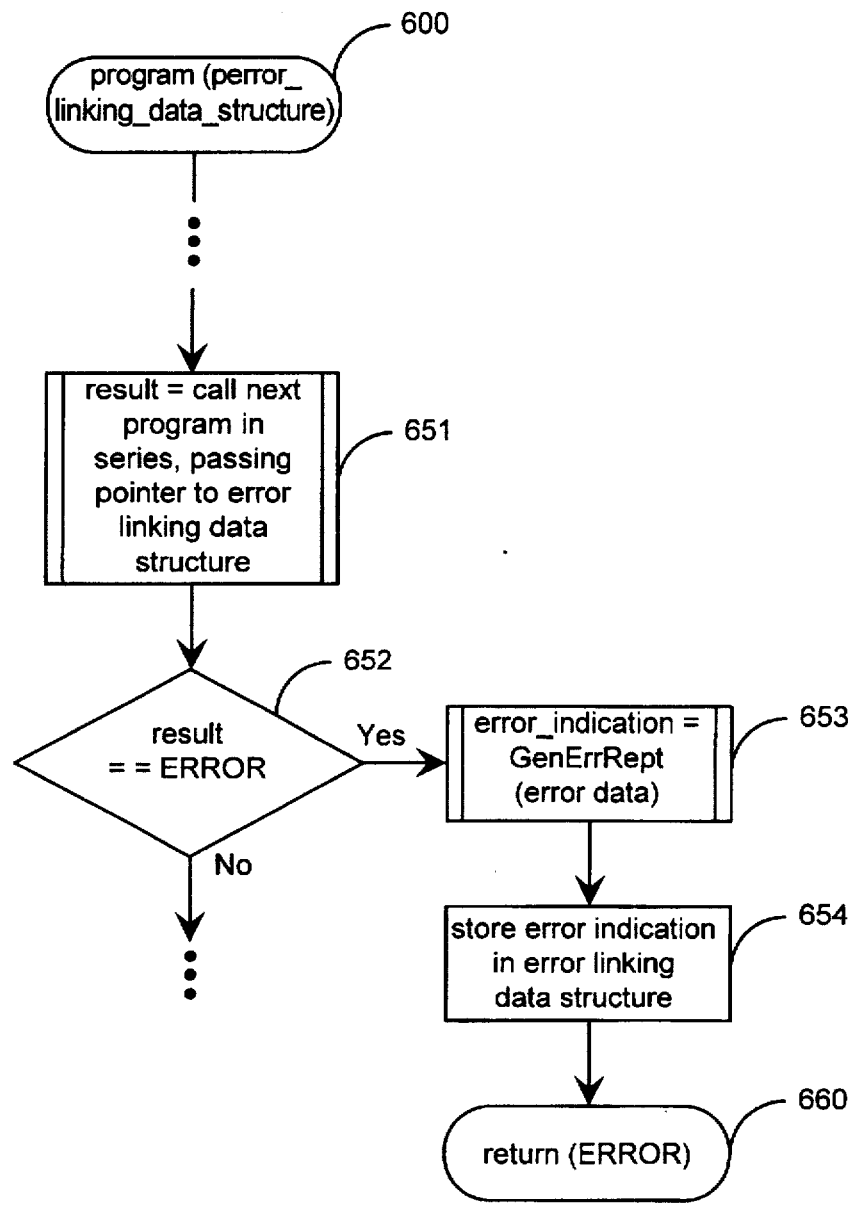
FIG. 6 is a flow diagram of the steps preferably performed by one or more "middle" programs in a series between the first program and the last program.

FIG. 6 is a flow diagram of the steps preferably performed by one or more "middle" programs in a series between the first program and the last program. The middle program receives a pointer to the error linking data structure allocated by the first program as a parameter. In the sample series of programs, the open method of the spreadsheet object (lines 21–28) is called by the print_document method of the document_manager object and is therefore a middle program.

The middle program differs from the first program (FIG. 5) in that it does not contain analogs to step 501 of the first program for allocating an error linking data structure or step 555 for reporting error linking information. Steps 651–654 of the middle program, however, are the same as steps 551–554 of the first program. Because the middle program contains step 651 to call the next program in the series, it is not the last program. In the sample series, the open method of the spreadsheet object therefore calls the open method of the file object (line 25), which is the next program in the series. The middle program passes the error linking data structure to the next program so that, if the second program generates an error report, it can store an indication of the error report in the error linking data structure. If the next program in the series returns an error return code, then the middle program calls the GenErrRept function to generate an error report indicating that the selected spreadsheet document could not be opened (lines 26–26A). The middle program then stores the reference number returned by the GenErrRept function in the error linking data structure passed by the middle program as a parameter (line 26B). In step 660, the middle program returns an error return code to the program by which it was called (line 27). These steps then conclude.

Figure 7:
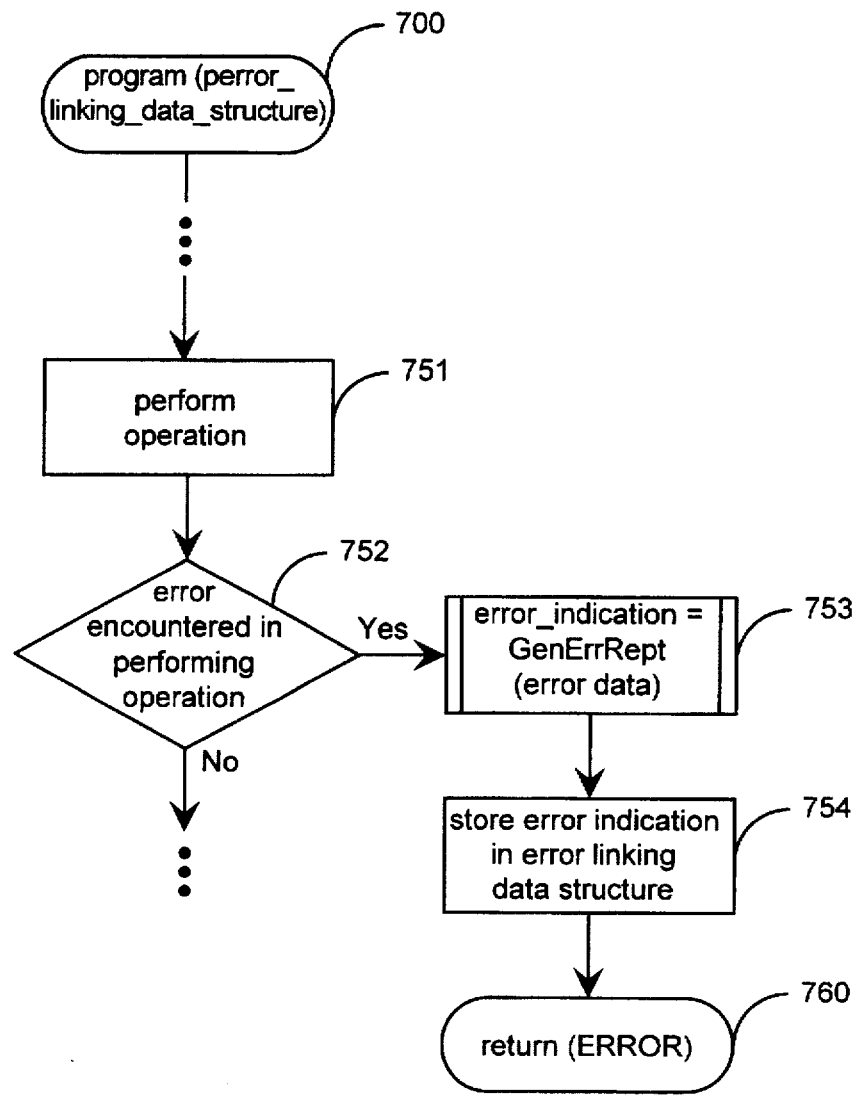
FIG. 7 is a flow diagram of the steps preferably performed by the last program in a series.

FIG. 7 is a flow diagram of the steps preferably performed by the last program in a series. The middle program receives the error linking data structure allocated by the first program as a parameter. In the sample series of programs, the open method of the file object (lines 39–47) is called by the open method of the spreadsheet object. The open method of the file is the last program, which differs from the first program in that it does not allocate or report the contents of an error linking structure, and differs from the middle program in that it does not call a next program in the series.

The last program differs from the middle program (FIG. 6) only in that it does not call another program in the series. In the sample series, the open method of the file object calls an operating system operation called _open in order to open a file containing the selected spreadsheet document (line 40) as the error-susceptible operation of step 751. If the _open operation returns an error return code, then the last program continues at steps 753–760 which are identical to steps 653–660 (FIG. 6) to handle the error, else the last program continues its normal execution (not shown). In step 753, the last program calls the GenErrRept function to generate an error report indicating that the file having the specified name has become corrupted (lines 42–42A). The last program then stores the reference number returned by the GenErrRept function in the error linking data structure, using the pointer to the error linking data structure received by the last program as a parameter (line 42B). In step 760, the last program returns an error return code to the program by which it was called (line 43). These steps then conclude.

The above discussion of the sample series is an example of the application of preferred embodiments of the invention to a case in which a failure occurs in an operating system operation below a program series. Such a failure, however, may occur within any program of a series, or, indeed, within a program outside the series called by a program of the series. In each of these cases, the first program of the series to detect the failure generates an error report and stores the reference number of the error report in the error linking object as described above, as do each of the preceding programs in the series.

Figure 8:
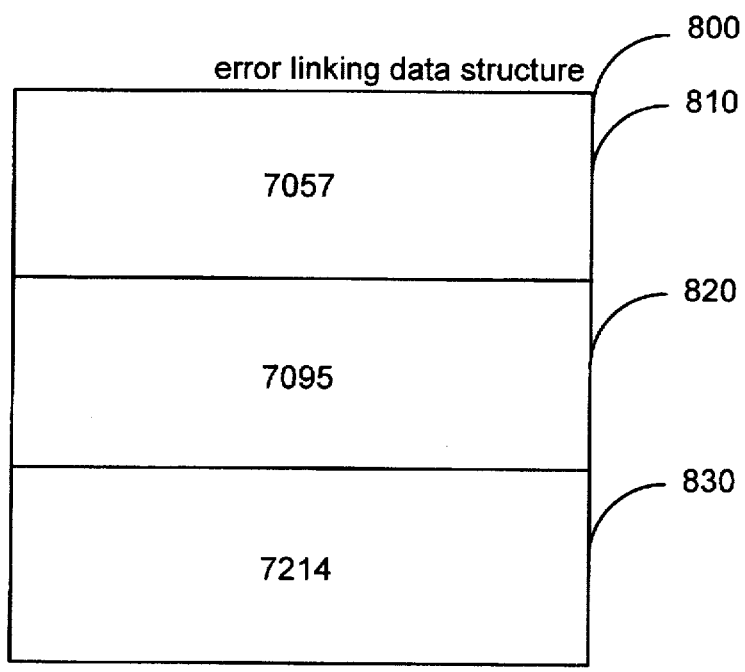
FIG. 8 is a diagram showing the contents of the error linking data structure after error linking information has been stored in it by the programs of the sample series after encountering a corrupted file error when trying to open a file containing a spreadsheet document specified by a user in a print request.

FIG. 8 is a diagram showing the contents of the error linking data structure after error linking information has been stored in it by the programs of the sample series after encountering a corrupted file error when trying to open a file containing a spreadsheet document specified by a user in a print request. The error linking data structure 800 contains indications 810, 820, and 830. Indication 810 was stored in error linking data structure 800 by the open method of the file object, and indicates the following error report that has been generated by the error log management program 382 (FIG. 3) and stored in the error log 381:

| Reference | Error Report |
| --- | --- |
| 7057 | Could not open file expenses.xls — corrupted. |

Indication 820 was stored in error linking data structure 800 by the open method of the spreadsheet object, and indicates the following error report that has been generated by the error log management program 382 (FIG. 3) and stored in the error log 381:

| Reference | Error Report |
|---|---|
| 7095 | Could not open spreadsheet document expenses. |

Indication 830 was stored in error linking data structure 800 by the print_document method of the document_manager object, and indicates the following error report that has been generated by the error log management program 382 (FIG. 3) and stored in the error log 381:

| Reference | Error Report |
|---|---|
| 7214 | Could not print document. |

When the first program reports the indications stored in the error linking data structure to the error log management program 382 (FIG. 3) in step 555 (FIG. 5), the error log management program uses the indications to associate the error reports displayed in the error log that relate to the same error. The contents of the error log may preferably be reviewed by a user of the error logging computer system 150 (FIG. 1), as well as by users of other connected computer systems, such as error reporting computer systems 110 and 120 (FIG. 1).

FIGS. 9 and 10-11, respectively, show two alternative error log display formats for associating the error reports displayed in the error log that relate to the same error. It will be appreciated by one skilled in the art that a variety of other approaches could also be used to gainfully associate the error reports displayed in the error log that relate to the same error. While other information typically associated with error reports—such as the time they were generated, the machine and process that generated them, and their severity level—is not explicitly shown in these figures, it will be appreciated by one skilled in the art that such information could gainfully be displayed in the error log in conjunction with the invention.

FIG. 9 is a screen diagram showing an error log display format for associating the error reports displayed in the error log that relate to the same error by spatially grouping such error reports together. The displayed error log 900 contains a first group of error reports 911-913 relating to the above-discussed sample error of failing to print a spreadsheet document because the file that contains it has become corrupted. The displayed error log 900 further contains a second group of error reports 921-922 relating to an error of failing to send an electronic mail message to a user named Thaddeus because an electronic mail gateway is not available, and a third group of error reports 931-934 relating to an error of failing to display configuration information contained in a configuration object stored in the file \\server7\config\shell.cfg because the server \\server7 is inaccessible. Because each group of error reports relating to the same error is spatially grouped together in the error log 900, users of the error log can quickly determine which error reports are related to a particular error and review them as a group.

FIGS. 10-11 are screen diagrams showing an error log display format for associating the error reports displayed in the error log that relate to the same error by displaying all such errors when one such error is selected by the user. FIG. 10 shows an error log 1000 containing error reports 1021, 1031, 1011, 1012, 1022, 1032, 1033, 1013, and 1034 relating to a variety of errors and sorted in reference number order. Such error reports preferably may be sorted and/or subsetted by generation time, severity level, or other configurable criteria. When a user of the error log selects a displayed error report, all of the error reports relating to the same error as the selected error report are displayed together, preferably in a pop-up window. One skilled in the art will appreciate additional ways in which related error reports may be displayed together. FIG. 11 shows that, in response to selection by a user of displayed error report 1113 relating to the printing error from the example, all of the errors relating to the printing error—1111, 1112, and 1113—are displayed together in pop-up window 1150.

While the error reports displayed in the error logs in FIGS. 9-11 are shown in ascending reference number order, one skilled in the art would appreciate that the error reports could instead be displayed in descending reference number order.

FIG. 12 is a screen diagram showing a displayed composite error report. The composite error report 1200 preferably contains text 1205 indicating the occurrence of related errors, as well as a listing of the contents of the related error reports 1210, 1220, and 1230. Such a composite error report is preferably displayed after the occurrence of the related errors when the error linking information stored on the error linking data structure is complete. The composite message 1200 is preferably generated and displayed by the first program in a series. In an alternate preferred embodiment, the composite error report 1200 is generated and displayed by another program, such as the error log management program 382.

While this invention has been shown and described with reference to preferred embodiments, it will be understood by those skilled in the art that various changes or modifications in form and detail may be made without departing from the scope of the invention. For example, some programs in the series may omit to generate an error report, especially where a program has no special information about the error.

We claim:

1. A method in a computer system for associating an error reported by a first program with an error reported by a second program that calls the first program, the method comprising the steps of:
   under the control of the second program:
      calling the first program;
   under the control of the first program:
      detecting the occurrence of an error, and
      generating a first error report containing information describing the error detected under the control of the first program, the first error report being associated with a first error report identifier;
   under the control of the second program:
      detecting the occurrence of an error, and
      generating a second error report containing information describing the error detected under the control of the second program, the second error report being associated with a second error report identifier; and
   based upon the program that generated the first error report having been called by the program that generated the second error report generating an indication that the error reports associated with the first error report identifier and the second error report identifier are related.

2. The method of claim 1, further including the step of displaying together on a display device information from the first error report and information from the second error report.

3. The method of claim 1, further including the step of storing in an error log stored on a storage device information from the first error report associated with information from the second error report.

4. The method of claim 1, further including the step of, under the control of the first program, returning to the second program an indication that an error was detected under the control of the first program, and wherein the step of detecting under the control of the second program includes the step of detecting that the first program returned an indication that an error was detected under the control of the first program.

5. The method of claim 1 wherein an error reported by a third program that is called by the first program is associated with errors reported by the first program and the second program, further including the steps of, under the control of the third program:

detecting the occurrence of an error; and generating a third error report containing information describing the error detected under the control of the third program, the error report being associated with a third error report indicator, and wherein the step of generating an indication generates an indication that the error reports associated with the first error report identifier, the second error report identifier, and the third error report identifier are related.

6. The method of claim 1, further including the steps of:

initializing an error linking data structure to an initial state;

under the control of the first program, storing the first error report identifier in the error linking data structure; and under the control of the second program, storing the second error report identifier in the error linking data structure, and wherein the step of generating an indication that the error reports associated with the first error report identifier and the second error report identifier are related includes the step of retrieving the first error report identifier and the second error report identifier from the error linking data structure.

7. The method of claim 1 wherein the step of generating an indication that the error reports associated with the first error report identifier and the second error report identifier are related is accomplished by, in the step of generating a second error report, generating a second error report containing the first error report identifier.

8. The method of claim 1 wherein the information contained in the second error report is indicative of the purpose for which the second program calls the first program.

9. A method in a computer system for constructing an error report linking data structure describing an error having manifestations that occur in each of a plurality of programs comprising a calling sequence, the method comprising the steps of:

initializing the error report linking data structure; and for each program of the calling sequence:

detecting the manifestation of the error occurring in the program, generating an error report containing information describing the s manifestation of the error occurring in the program, and storing a reference to the generated error report in the error report linking data structure, such that the error report linking data structure contains a reference to each error report generated by a program in the calling sequence to identify the generated error reports as related.

10. The method of claim 9, further including the step of using the constructed error report linking data structure to associate the generated error reports for review by a user.

11. A method in a computer system for describing an error having manifestations in each of a plurality of programs comprising a calling sequence, the method comprising the steps of:

(a) under the control of each of the programs of the calling sequence, detecting the manifestation of the error occurring in the program and generating an error report containing information descriptive of the manifestation of the error occurring in the program; and (b) based on the fact that the error reports generated in step (a) are generated by programs comprising a calling sequence, generating an indication identifying the error reports generated in step (a) and indicating that the error reports generated in step (a) relate to the same error.

12. The method of claim 11, further including the step of, using the indication generated in step (b), generating a consolidated error report containing information from one or more of the error reports generated in step (a).

13. The method of claim 11, further including the step of, using the indication generated in step (b), displaying in association portions of two or more of the error reports generated in step (a).

14. A method in a computer system for associating data related to an error that is encapsulated by a first object with data related to the same error that is encapsulated by a second object, the method comprising the steps of:

in a function member of the second object, invoking a function member of the first object;

detecting the occurrence of the error in a function member of the first object;

generating a first error report containing data encapsulated by the first object relating to the occurrence of the error detected in the function member of the first object;

detecting the occurrence of the error in a function member of the second object;

generating a second error report containing data encapsulated by the second object relating to the occurrence of the error detected in the function member of the second object; and generating an indication that the first error report and the second error report relate to the same error.

15. The method of claim 14, further including the step of displaying together information from the first error report and information from the second error report.

16. The method of claim 14, further including the step of storing in an error log information from the first error report associated with information from the second error report.

17. An apparatus for associating a plurality of error reports relating to the same error, each of the error reports being generated by one of a series of programs that call one another, the apparatus comprising:

a memory for containing an error report linking data structure;

a storing agent for storing information in the error report linking data structure identifying each error report generated by a program in the series; and an associating agent for using the information stored in the error report linking data structure by the storing agent to associate the error reports identified thereby to identify these error reports as relating to the same error.

18. The apparatus of claim 17, further including:
a memory for containing an error log for containing error reports; and
an error logging agent for storing the error reports generated by programs in the series in the error log, and wherein the associating agent associates the error reports relating to the same error after the error logging agent has stored the error reports relating to the same error in the error log.

* * * * *